United States Patent
Horvath

[11] 3,939,658
[45] Feb. 24, 1976

[54] POWER BRAKE BOOSTER
[75] Inventor: Robert A. Horvath, Dayton, Ohio
[73] Assignee: General Motors Corporation, Detroit, Mich.
[22] Filed: Oct. 21, 1974
[21] Appl. No.: 516,155

[52] U.S. Cl. .................................. 60/548; 91/431
[51] Int. Cl.² ........................................ B60T 13/12
[58] Field of Search ........ 60/547, 548, 555; 91/431; 251/333

[56] References Cited
UNITED STATES PATENTS

| | | | |
|---|---|---|---|
| 3,691,903 | 9/1972 | Shellhause | 91/431 |
| 3,786,636 | 1/1974 | Kobashi | 60/548 |
| 3,796,134 | 3/1974 | Kaptrosky | 60/548 |

FOREIGN PATENTS OR APPLICATIONS

| 1,116,085 | 6/1968 | United Kingdom | 91/431 |
|---|---|---|---|

Primary Examiner—Martin P. Schwadron
Assistant Examiner—H. Burks, Sr.
Attorney, Agent, or Firm—D. D. McGraw

[57] ABSTRACT

A hydraulic power brake booster powered by power steering gear pump pressure and utilizing an open-center valve so that fluid flows through the booster without pressure reduction when the booster is not activated. The booster has two power chamber sections, both being pressurized at the same time under normal brake operation. However when the brakes are applied very fast, a high rate of pressure increase occurs in one chamber but not in the other due to a flow restriction between the two chambers. The booster piston assembly will therefore move in the brake applying direction more quickly than it would if the pressure fluid should be acting on the full power piston diameter since less displacement is momentarily required to build up the necessary pressure. The chamber section with the slower pressure buildup rate will increase in volume and be maintained full of fluid by a check valve arrangement extending through the piston and connecting with the low pressure side of the piston. This prevents a vacuum lock or retardation effect. A check valve is provided between the power chamber sections to allow flow from the chamber section with the slower pressure buildup rate to the chamber with the faster pressure buildup rate, but not in the other direction. This arrangement prevents a slow brake release response by allowing both of the chambers to dump their pressures quickly.

3 Claims, 2 Drawing Figures

POWER BRAKE BOOSTER

The invention relates to a power brake booster using an open-center valve arrangement, and more particularly to one in which the power chamber is divided into two sections, with both sections being pressurized at substantially the same rate during normal brake operation. When the brake is actuated very quickly, however, only one chamber section is quickly pressurized, and the other one has a slower pressure buildup rate due to a flow restriction provided between the two chamber sections. This permits quicker brake apply. The chamber with the slower pressure buildup rate is maintained full of fluid as its volume increases, even though the restrictive flow would otherwise be insufficient to do so, by means of a check valve arrangement connecting that chamber with the exhaust or low pressure side of the piston. If the pressure in the slow buildup rate chamber is less than that on the exhaust side of the piston, the check valve opens and permits fluid to fill the chamber. This effectively prevents a vacuum lock or retardation effect.

In some installations a brake release might be slower than desirable due to the flow restriction between the power chamber sections. When this is likely to occur, a check valve is provided between the power chamber sections to permit flow from the slow buildup rate chamber to the fast buildup rate chamber, permitting dumping of the fluid from both chambers without delay.

This invention relates to a modification of the power brake construction and arrangement disclosed and claimed in U.S. Pat. No. 3,699,680, entitled "Hydraulic Power Brake Booster and Open Center Control Valve Therefor" issued Oct. 24, 1972, to Ronald L. Shellhause and assigned to the common assignee.

IN THE DRAWINGS

Figure 1:
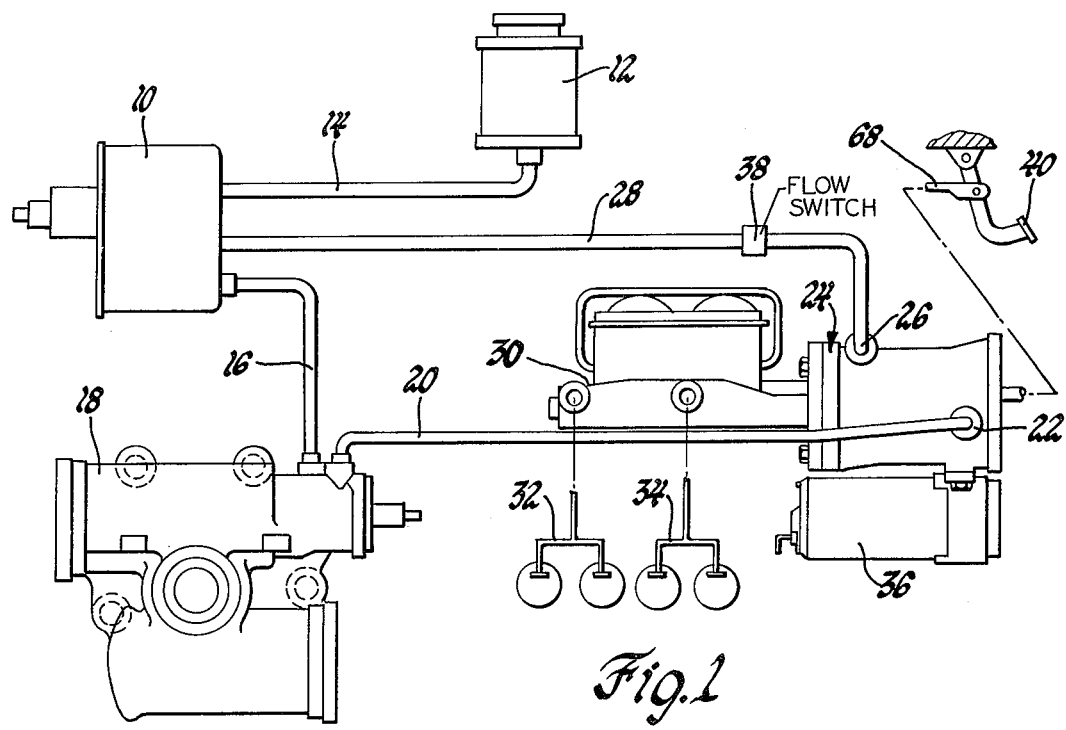
FIG. 1 is a schematic representation of a vehicle power steering and braking system embodying the invention.

In the system shown in FIG. 1, the power steering pump 10 is provided with a hydraulic fluid reservoir 12 connected to the input side of the pump by conduit 14. The pump output conduit 16 is connected to the power steering gear 18, which is of the open-center type so that in the at-rest position hydraulic fluid is pumped freely through the gear. The conduit 20 connects the output side of the power steering gear 18 with the inlet 22 of the hydraulic power brake booster 24. The booster outlet 26 is connected to the sump or inlet side of the power steering pump 10 by conduit 28, thus completing the hydraulic fluid circuit.

The booster 24 is connected to actuate a master cylinder assembly 30 which provides brake pressure to the front brake system 32 and the rear brake system 34 of the vehicle in which the hydraulic system is installed. The booster 24 is also shown as being provided with an electro-hydraulic pump 36 which is actuated when necessary to provide sufficient hydraulic fluid flow and pressure availability to operate the booster 24 when insufficient hydraulic fluid flow and pressure availability is provided through conduit 20. The pump 36 is arranged to be actuated as necessary, and may, for example, be actuated by a flow switch 38 provided in one of the conduits, such as conduit 28. The booster assembly 24 is schematically illustrated as being controlled by the vehicle brake pedal 40.

Figure 2:
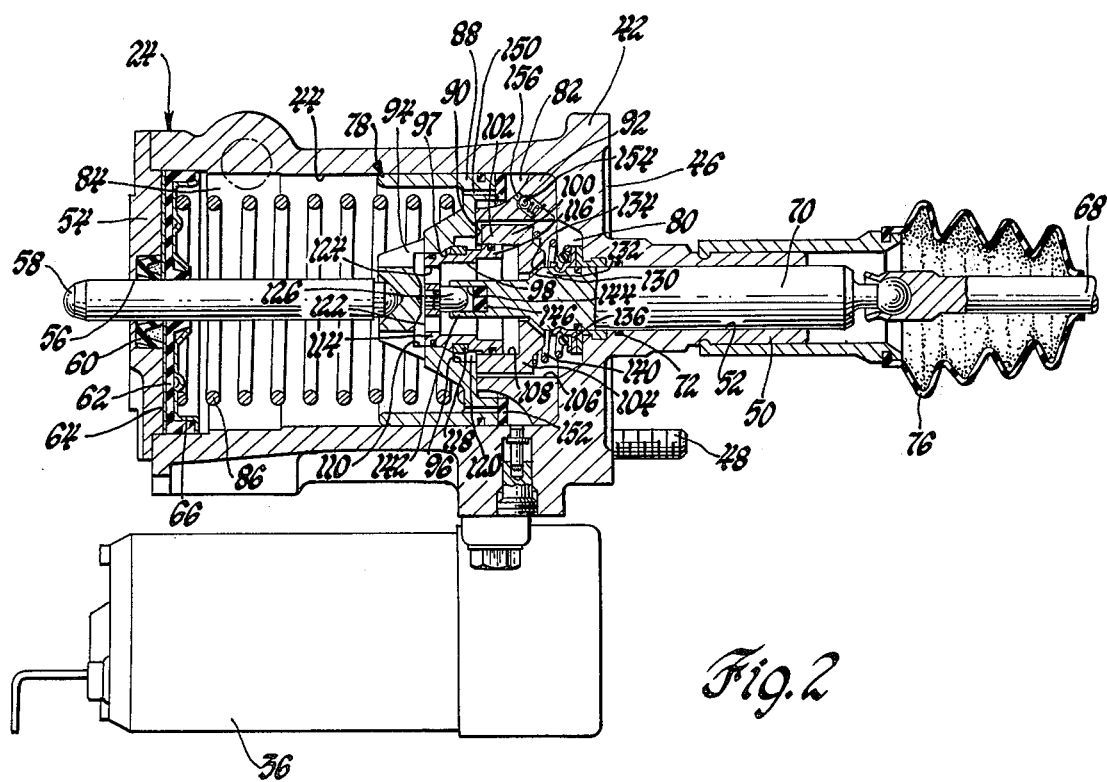
FIG. 2 is a cross section view of the hydraulic brake booster used in the system of FIG. 1.

The booster assembly 24 is illustrated in detail in FIG. 2. The housing 42 is formed to provide a cylinder 44. The rear end 46 of the cylinder provides for booster mounting by means of studs 48. Cylinder rear end 46 is also formed to provide a rearwardly extending sleeve 50 which is provided with a bore 52 extending through the sleeve and rear end 46 and axially aligned with the cylinder 44. The forward end 54 of the housing 42 has a cylinder cover which is centrally apertured at 56 so that the booster output push rod 58 extends therethrough and is reciprocably moved when the brake is operated. A suitable seal 60 is also mounted in cover 54. The cylinder seal 62 is provided with a seal support plate 64 fitting against the inner wall of the cover 54, and a seal expander 66 on the cylinder side of the seal.

The brake pedal assembly 40 acts through the push rod 68 to actuate the booster. The forward end of push rod 68 is connected to input member 70 which is slidably received in bore 52 of sleeve 50 and extends into the cylinder 44. The inner portion of bore 52 is provided with an O-ring seal 72 which effectively prevents leakage of hydraulic fluid between input member 70 and bore 52. A suitable boot 76 is also mounted over sleeve 50 and push rod 68 to prevent contamination.

The cylinder 44 is divided by a power piston 78 into an inlet or power chamber, which is divided into first and second inlet or power chamber sections 80 and 82, and an outlet or exhaust chamber 84. Piston 78 is reciprocably movable in cylinder 44 during brake booster operation and is urged to the brake release position by spring 86. The piston includes a sealed skirt section 88 which fits cylinder 44, and has at its rearward end a positioning shoulder 90. An abutment sleeve 92 is mounted in the rear end of cylinder 44 and acts as an abutment for piston 78 as well as a divider for chambers 80 and 82.

Piston 78 is also provided with passage means interconnecting the inlet chamber 80 and the outlet chamber 84, the passage means including a passage 94 extending through the piston wall and a stepped recess 96 which mounts the control valve and reaction mechanism. The valve mechanism controls the flow of hydraulic fluid from the inlet chamber section 80 to the outlet chamber 84 through the passage means, thereby controlling the pressure differential across the power piston 78. The control valve or valve mechanism is described below and includes a valve seat 100 having a valve seat face 130 and valve 132 having a valve face 134. The larger rearward portion of recess 96 provides a reciprocable mounting for the reaction piston 98, which in turn provides a reciprocable mounting for the valve seat 100. The forward end 102 of valve seat 100 abuts against shoulder 90 of piston 78. The valve seat 100 has a cylinder-like skirt section 104. The outer periphery of skirt section 104 is of lesser diameter than the diameter of the inner cylinder 106 in which it fits so as to provide for radial movement of the valve seat. Valve seat skirt section 104 and the divider 92 cooperate to provide a restrictive flow passage connecting first power chamber 80 and second power chamber 82.

The valve seat skirt section 104 has a cylinder 108 formed by the interior wall thereof. Also, cylinder section 110 is formed in the forward part of stepped recess 96 and is of smaller diameter than cylinder 108. Stepped recess 96 also includes a beveled shoulder 97.

The reaction piston 98 has a small diameter forward land 114 received in cylinder section 110 and rearward larger diameter land 116 received in cylinder 108. A portion of reaction piston 98 between the lands is stepped to provide a mounting for the reaction piston snubber 118. Snubber 118 cushions forward movement of the reaction piston 98. A reaction chamber 120 is located between snubber 118, valve seat forward end 102, power piston 78 and reaction piston 98. Reaction piston 98 is generally cup-shaped and its forward face 122 at land 114 is provided with axially extending passages 124 which fluid connect outlet chamber 84, through passage 94 and the forward portion of recess 96 with the downstream side of the valve seat 100. A snubber piston 126 is secured to the rear side of reaction piston face 122 and extends rearwardly in a manner and for the purposes described below.

Valve seat 100 includes a frusto-conical seat face 130 which is aligned coaxially with the power piston 78, the input member 70, the stepped recess 96, the reaction piston 98, the snubber piston 126, and the output push rod 58. The input member 70 includes a valve 132 formed to provide a frusto-conical valve face 134 which is positioned to mate with and extend through valve seat face 130. A spring retainer 136 is secured to input member 70 rearwardly of valve 132. A valve return spring 140 seats on retainer 136 at one end and on valve seat 100 at the other end to urge the valve faces apart and, therefore, position the valve 132 in relation to the cylinder end wall 46 when the booster is at rest. The forward end of input member 70, forward of valve face 134, is provided with an end section 142 located within the chamber formed by recessed reaction piston 98. The end section is provided with a cylinder-like recess 144 which is somewhat larger in diameter than snubber piston 126. The rear end of snubber piston 126 extends slightly into recess 144. A rubber-like snubber 146 is received at the bottom of recess 144 and is slightly spaced from the spherical end of snubber piston 126 when the booster is at rest.

Power piston 78 has passages 150 extending therethrough so as to connect second power chamber section 82 with exhaust chamber 84. A check valve 152, formed by an annular rubber-like ring, is positioned on the piston in chamber section 82 so as to close passages 150 except when the pressure in chamber 84 exceeds the pressure in chamber section 82. Another check valve 154 is in a passage 156 formed in divider 92. Passage 156 connects chamber sections 80 and 82, with check valve 154 permitting flow from chamber section 82 to chamber section 80, but preventing flow through passage 156 in the reverse direction.

When the system is at rest, with the power steering pump 10 being driven, hydraulic fluid is permitted to flow freely through the power steering gear 18 and the booster 24 and return to the pump without restriction. When the vehicle is steered leftwardly or rightwardly, the power steering gear 18 operates to build up a back pressure in conduit 16 and establish a pressure differential to provide power to the steering gear, as is well known in the art. When the vehicle brake is actuated by depression of the brake pedal 40, the input member 70 moves forwardly, closing the space between valve seat face 130 and valve face 134. Initial closure will result in contact of the valve 132 with the valve seat face 130, causing the valve seat to move radially if it was slightly off center, to align the valve seat with the valve. This initial valve closure also restricts fluid flow between the valve faces, causing pressure to build up in the first power chamber section 80 to establish a pressure differential across the power piston 78. When the brake is operated in a normal manner and not unusually fast, the pressure and flow of fluid passes from chamber 80 through the restriction 105 between the valve seat skirt section 104 and the inner cylinder wall 106 of the divider 92, and into the second power chamber section 82 as piston 78 moves leftwardly relative to divider 92. Under such conditions of operation, the pressure in chamber section 82 increases substantially concurrently with the pressure in chamber section 80. However, if the brakes are applied very fast, the restriction 105 between the valve seat skirt section and divider 92 is sufficient to permit a faster pressure build up in chamber section 80 than in chamber section 82. This pressure increase in chamber section 80 will move the piston assembly forward more quickly than if the pressurized fluid had to act on the full piston effective area. As the piston moves forward, chamber section 82 will increase in volume. If the restrictive flow from chamber section 80 is unable to keep this increasing volume filled with fluid, fluid flows from chamber 84 through passages 150, opening check valve 152, and filling chamber section 82. As the rate of brake actuation decreases, the flow from chamber section 80 to chamber section 82 is able to build up the pressure in chamber section 82 but at a slower rate. As the pressure increases in chamber section 82, check valve 152 closes passages 150 and the full piston effective area is subjected to pressure differential.

Upon brake release, the input member 70 is moved rightwardly by spring 140, slightly opening the valve faces and permitting a decrease in the pressure differential across power piston 78. If the brake pedal has been quickly released, pressure decrease in chamber section 82 may be somewhat slower due to the restrictive effect of the passage between the valve seat skirt section 104 and the divider 92 than is the pressure decrease in chamber section 80. In order to provide for a fast rate release response when this would otherwise occur, check valve 154 is provided. This valve permits flow from chamber section 82 at chamber section 80 when there is a slight pressure differential therebetween with chamber section 82 being at the higher pressure. The check valve is closed when chamber section 80 is at the same or a higher pressure than chamber section 82.

What is claimed is:
1. A hydraulic brake booster comprising:
 a housing;
 a power piston reciprocably received in said housing and defining therewith
  first and second inlet chamber sections, said first section being operatively fluid connected to a source of hydraulic fluid pressure, said second section being in restrictive flow communication with said first section through a restrictive passage,
  and an outlet chamber on the other side of said piston from said inlet chamber sections;
 an input member;
 valve means controlled by said input member for establishing a hydraulic pressure differential across said piston to actuate the booster;
 an output member connected to said piston for transmitting forces between said booster and a brake master cylinder assembly;

said inlet chamber sections being pressurized substantially concurrently upon booster actuation with said second section freely receiving pressurized fluid through said restrictive passage from said first section until the rate of pressure increase in said first section exceeds the rate transmittable through said restrictive passage, at which time said first section is pressurized at a faster rate than is said second section to move said piston and said output member in the brake actuating direction;

and check valve means between said second inlet chamber section and said outlet chamber permitting fluid flow from said outlet chamber to said second inlet chamber section when said piston is moved by pressure only in said first inlet chamber section, due to a high rate of pressure increase therein, and the consequent increase in volume of said second inlet chamber section at a rate faster than fluid can be supplied thereto through said restrictive passage, thereby preventing a vacuum block or retardation effect.

2. A hydraulic booster comprising:

a housing having a power piston reciprocably received therein to define an inlet power chamber and an outlet exhaust chamber;

a divider in said inlet power chamber defining with said power piston and said housing a first inlet power chamber section and a second inlet power chamber section, said divider and an element movable with said power piston defining a restrictive flow passage connecting said first and second inlet power chamber sections to permit limited fluid flow therebetween;

check valve means in said power piston permitting flow of hydraulic fluid from said outlet exhaust chamber to said second inlet power chamber section;

and control valve means controlling the changes in pressure differential across said power piston to actuate and release said booster;

said first inlet power chamber being pressurized upon booster actuation at a pressure rate of increase determined by operation of said valve means, and when pressurized at a pressure rate of increase greater than that which can be transmitted through said restrictive flow passage acting to move said power piston to increase the volume of both of said inlet power chamber sections, said check valve means opening to supply fluid from said outlet exhaust chamber to said second inlet power chamber section until the supply of fluid through said restrictive flow passage from said first inlet power chamber section transmits pressure therethrough, after which both of said inlet power chamber sections are pressurized.

3. In a power booster having a housing divided into a pressure chamber and an exhaust chamber by a movable power wall having an effective area across which pressure differentials may be established, a divider in said pressure chamber separating said pressure chamber into a first section having a first portion of the power wall effective area as one side thereof and a second section having a second portion of the power wall effective area as one side thereof, means including said divider and an element movable with said power wall defining a restrictive flow passage connecting said pressure chamber sections which limits fluid flow therebetween to a predetermined maximum rate, first check valve means in said power wall connecting said exhaust chamber and said second pressure chamber section in fluid flow relation only when pressure in said exhaust chamber is greater than pressure in said second pressure chamber section, second check valve means in said divider connecting said first and second pressure chamber sections in fluid flow relation only when pressure in said second pressure chamber section is greater than pressure in said first pressure chamber section, and control valve means for controlling the pressure differentials across said power wall.

* * * * *